United States Patent
Tani et al.

(10) Patent No.: US 11,577,336 B2
(45) Date of Patent: Feb. 14, 2023

(54) SENSOR DEVICE FOR WELDING

(71) Applicants: DAIHEN CORPORATION, Osaka (JP); KYOCERA CORPORATION, Kyoto (JP)

(72) Inventors: Nobuhiro Tani, Osaka (JP); Hirokazu Saito, Osaka (JP); Kengo Onishi, Ome (JP); Tomohiro Noguchi, Ome (JP); Daisuke Kanai, Ome (JP)

(73) Assignees: DAIHEN CORPORATION, Osaka (JP); KYOCERA CORPORATION, Kyoto (JP)

( * ) Notice: Subject to any disclaimer, the term of this patent is extended or adjusted under 35 U.S.C. 154(b) by 480 days.

(21) Appl. No.: 16/494,146

(22) PCT Filed: Mar. 16, 2018

(86) PCT No.: PCT/JP2018/010454
§ 371 (c)(1),
(2) Date: Sep. 13, 2019

(87) PCT Pub. No.: WO2018/169048
PCT Pub. Date: Sep. 20, 2018

(65) Prior Publication Data
US 2020/0009675 A1    Jan. 9, 2020

(30) Foreign Application Priority Data

Mar. 17, 2017 (JP) .............................. JP2017-053427

(51) Int. Cl.
  *B23K 9/095*   (2006.01)
  *B23K 9/12*    (2006.01)
  (Continued)

(52) U.S. Cl.
  CPC ............ *B23K 9/0956* (2013.01); *B23K 9/125* (2013.01); *B23K 9/126* (2013.01); *B23K 31/00* (2013.01); *G01B 11/24* (2013.01)

(58) Field of Classification Search
  CPC ...... B23K 26/00; B23K 9/0956; B23K 9/125; B23K 9/126; B23K 31/00; G01B 11/24
  (Continued)

(56) References Cited

U.S. PATENT DOCUMENTS 4,497,996 A    2/1985   Libby, Jr. et al.
4,542,279 A *  9/1985   Case, Jr ............... B23K 9/1274
                                                  219/124.34

(Continued)

FOREIGN PATENT DOCUMENTS

CN    106270947 A    1/2017
JP    2000-301339 A  10/2000
(Continued)

OTHER PUBLICATIONS

Machine translation of JP 2011-245517 performed on Jun. 15, 2022.*
Human translation of KR20130012275 performed on Apr. 2, 2022.*
Extended European Search Report in Europe Application No. 18767593.9, dated Dec. 16, 2020, 4 pages.

*Primary Examiner* — Tu B Hoang
*Assistant Examiner* — Alba T Rosario-Aponte
(74) *Attorney, Agent, or Firm* — Crowell & Moring LLP

(57) ABSTRACT

A gas, which flows between a welding device and work pieces while the work pieces are welded together, has large influence on the welding. A sensor device includes a sensor unit and a container that includes a housing case (i.e., housing portion) and a shielding member (i.e., shielding portion). The shielding member is attached to the housing case, and shields radiation heat directed toward the lower surface of the housing case among radiation heat generated while the work pieces W are welded together. The shielding (Continued)

member is inclined with respect to a flow direction of a gas passing through an outlet port for detection of a second gas flow channel so that the gas discharged from the outlet port for detection is blown to the shielding member and thus flows to a side opposite to the side where the work pieces W are to be welded together.

7 Claims, 12 Drawing Sheets

(51) Int. Cl.
  *B23K 31/00* (2006.01)
  *G01B 11/24* (2006.01)
(58) Field of Classification Search
  USPC ............... 219/137.43, 121.83, 121.6, 130.01
  See application file for complete search history.

(56) References Cited

U.S. PATENT DOCUMENTS

| | | | | |
|---|---|---|---|---|
| 2012/0229632 | A1* | 9/2012 | Hoertenhuber | B23K 9/0956 348/143 |
| 2016/0368089 | A1* | 12/2016 | Grapov | G02B 27/40 |

FOREIGN PATENT DOCUMENTS

| | | | |
|---|---|---|---|
| JP | 2004-195502 A | | 7/2004 |
| JP | 2011-245517 A | | 12/2011 |
| JP | 2011245517 A | * | 12/2011 |
| KR | 2013-0012275 A | | 2/2013 |
| KR | 20130012275 A | * | 2/2013 |

* cited by examiner

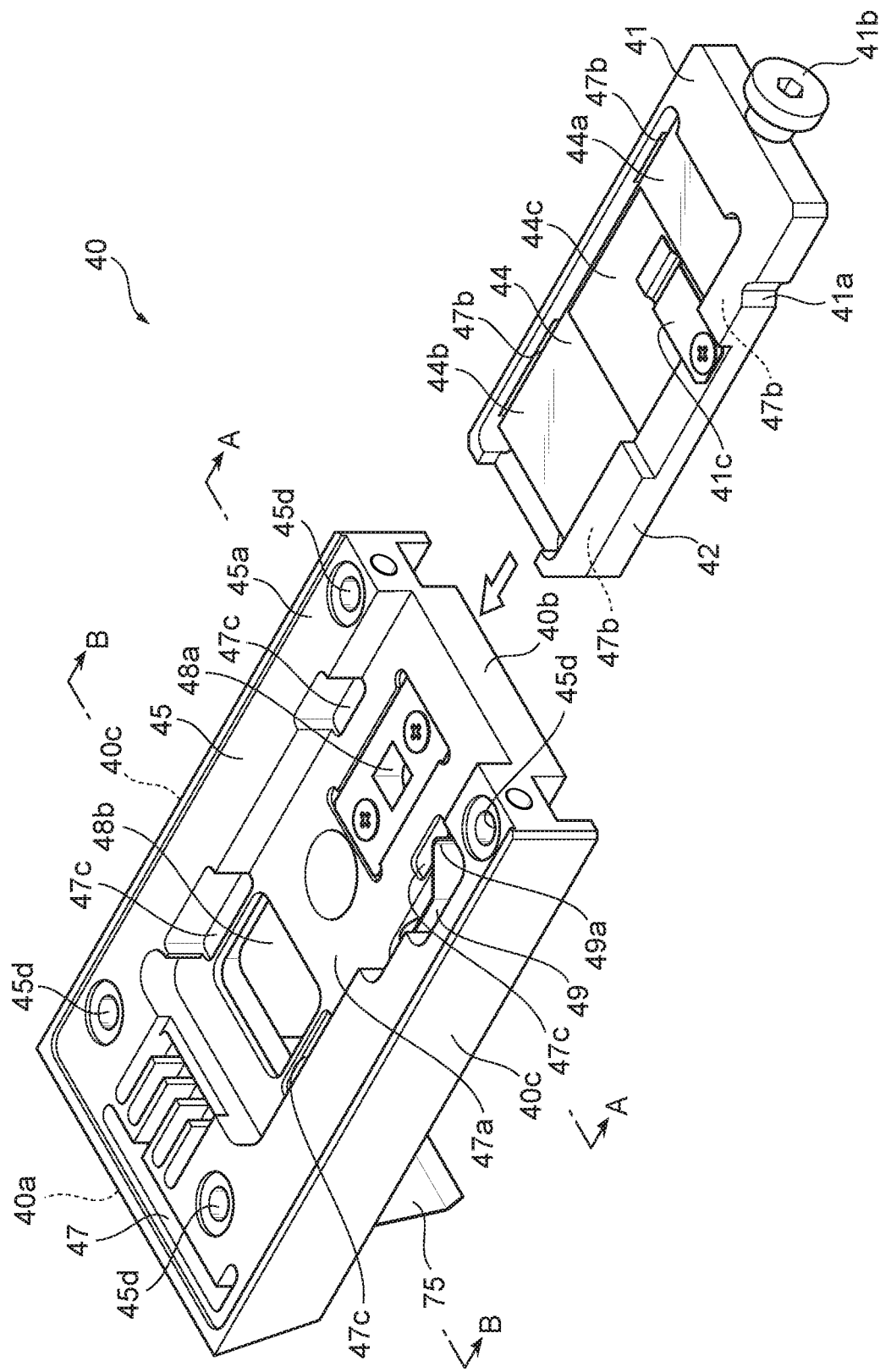

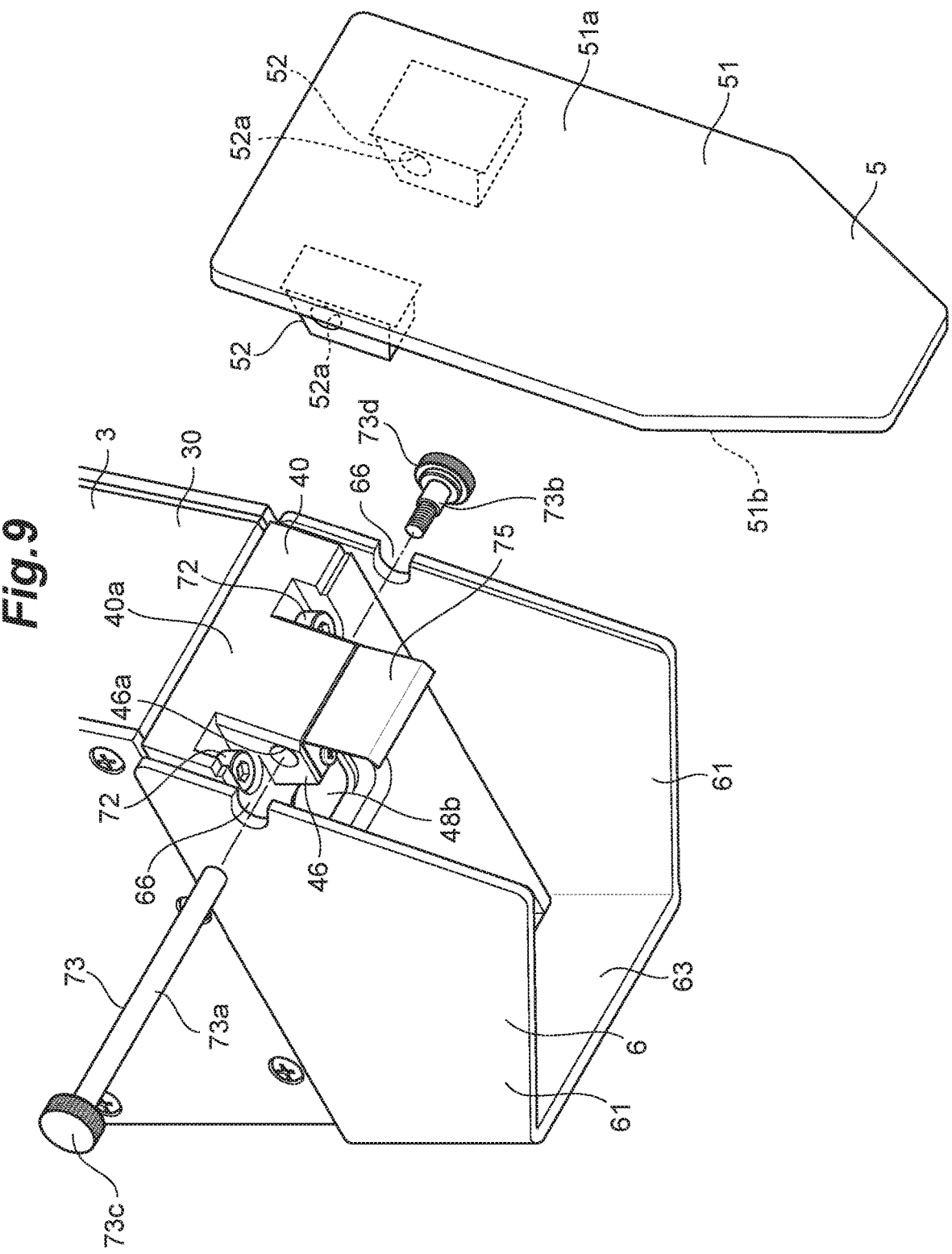

SENSOR DEVICE FOR WELDING

This application is a 371 application of PCT/W2018/010454 having an international filing date of Mar. 16, 2018, which claims priority to W2017-053427 filed Mar. 17, 2017, the entire content of each of which is incorporated herein by reference.

TECHNICAL FIELD

The present invention relates to a sensor device for welding that is suitably used for welding work pieces together.

BACKGROUND ART

Conventionally, when a pair of iron plates with grooves are welded together through butt welding using arc welding, for example, a welding torch is brought close to the work pieces (i.e., to the portions with grooves that are butted together). In such a state, a voltage is applied across the tip end of a welding wire fed from the welding torch and the work pieces so that an arc is generated between them. Thus, the welding wire is melted and the work pieces are also heated and melted so that the work pieces can be welded together.

When welding is performed, the distance between the welding torch and the work pieces or the shapes of the work pieces will influence the quality of the work pieces to be welded together. In view of such a point, Patent Literature 1 proposes a sensor device for welding that measures the shapes of the work pieces or the distance to the work pieces, for example.

The sensor device for welding disclosed in Patent Literature 1 includes a laser beam projection unit that projects a laser beam, and a detection unit that detects a laser beam reflected from the surfaces of work pieces, and measures the shapes of the work pieces from the detected laser beam. The laser beam projection unit and the detection unit are housed within a housing case including a housing (i.e., case body) and a protective cover. The protective cover has formed thereon a shielding plate for shielding sputter that is generated from the work pieces while they are welded together. Further, the protective cover has formed therein a slit for allowing a gas to flow in the direction along the optical axis of the laser beam projection unit, so that the gas is discharged from an outlet port located at an end of the slit.

CITATION LIST

Patent Literature

Patent Literature 1: JP 2004-195502 A

SUMMARY OF INVENTION

Technical Problem

According to the sensor device of Patent Literature 1, as a gas is discharged from the slit, fume generated during welding can be prevented from entering the housing case. However, it is concerned that the gas discharged from the slit may flow toward the side where the work pieces are to be welded together and thus may be mixed into the resulting welded portion.

Further, when arc welding is performed, for example, an inert gas (i.e., so-called shielding gas) may be supplied from the tip end of the welding torch so as to cover a region around an arc and prevent reactions between molten metal and an active gas, such as oxygen, during welding. However, even when such a shielding gas is supplied, it is concerned that the flow of the shielding gas may be disturbed by the aforementioned gas so that an active gas and the like in the air may be mixed into the resulting welded portion.

The present invention has been made in view of the foregoing, and provides a sensor device for welding that can reduce influence of a gas discharged from the sensor device on welding.

Solution to Problem

The inventors have conducted concentrated studies and found that using a shielding portion, which is adapted to shield radiation heat generated during welding, can change a flow of a gas to be discharged from an outlet port toward work pieces, and can also cool radiation heat that is input to the shielding portion, using the gas.

The present invention has been made based on the new finding of the inventors. A sensor device for welding according to the present invention is a sensor device for welding, including at least a sensor unit configured to measure the states of work pieces to be welded together or the distance to the work pieces, and a container including a housing portion and a shielding portion, the housing portion being adapted to house the sensor unit and having formed therein a gas flow channel that passes a gas, and the shielding portion being adapted to shield radiation heat directed toward the housing portion among radiation heat generated while the work pieces are welded together, in which the shielding portion is inclined with respect to a flow direction of a gas passing through an outlet port of the gas flow channel such that the gas discharged from the outlet port is blown to the shielding portion and thus flows to a side opposite to the side where the work pieces are to be welded together.

According to the present invention, since a gas discharged from the outlet port is blown to the shielding portion by the shielding portion, the shielding portion can be cooled with the gas. Further, since the gas blown to the shielding portion flows to a side opposite to the side where the work pieces are to be welded together, the gas becomes unlikely to flow to the side where the work pieces are to be welded together. Accordingly, the influence of the gas (or a flow thereof) discharged from the outlet port can be reduced in the portion where the work pieces are to be welded together, and thus, stable welding can be performed.

Herein, the gas flow channel may be formed so as to cool the inside of the housing case, for example, and the configuration of the gas flow channel is not particularly limited as long as a gas is discharged from the outlet port. However, as a more preferable embodiment, the sensor unit includes at least a detection unit configured to detect as a detection light beam a light beam from surfaces of work pieces to be welded together, the container includes a case body adapted to house the sensor unit as the housing portion, the case body having formed therein at least one pass-through portion that passes a detection light beam directed toward the detection unit, and a protective cover including a protective plate that transmits the detection light beam, the protective cover being attached to the case body such that the protective plate covers the pass-through portion, and the gas flow channel is formed such that gases are blown toward the protective plate from opposite positions of a portion around the protective plate on the side of the outlet port, and the gases blown to the protective plate are directed toward the outlet port.

According to such an embodiment, as gases are blown to the protective plate from opposite positions of a portion around the protective plate on the side of the outlet port, sticking of foreign matter and the like to the protective plate can be reduced, and also, fume directed toward the protective plate can be reduced. Further, the gases blown to the protective plate from opposite positions thereof mutually collide with each other while also colliding with the surface of the protective plate so that the flow velocities of the gases are reduced and the resulting merged gas can be discharged from the outlet port. Thus, as the gases have the reduced flow velocities, the gases become less likely to flow toward the side where the work pieces are to be welded together.

Herein, as a more preferable embodiment, the sensor unit includes at least a laser beam projection unit configured to project a laser beam onto surfaces of work pieces to be welded together, and a detection unit configured to detect a laser beam reflected from the surfaces of the work pieces as the detection unit, the sensor unit being configured to measure from the detected laser beam shapes of the work pieces or the distance to the work pieces, the case body has formed therein, as the pass-through portion, a pass-through portion for laser beam projection and a pass-through portion for detection, the pass-through portion for laser beam projection being adapted to pass a laser beam from the laser beam projection unit, and the pass-through portion for detection being adapted to pass a laser beam directed to the detection unit, the protective plate includes a protective portion for laser beam projection and a protective portion for detection, the protective portion for laser beam projection covering the pass-through portion for laser beam projection, and the protective portion for detection covering the pass-through portion for detection, the outlet port includes an outlet port for laser beam projection and an outlet port for detection, the outlet port for laser beam projection being adapted to discharge a gas blown to the protective portion for laser beam projection, and the outlet port for detection being adapted to discharge a gas blown to the protective portion for detection, the cross-section of a flow channel of the outlet port for detection that passes a gas is larger than that of the outlet port for laser beam projection that passes a gas, and the outlet port for detection is formed closer to the shielding portion than is the outlet port for laser beam projection.

According to such an embodiment, since the cross-section of the flow channel of the outlet port for detection that passes a gas is larger than that of the outlet port for laser beam projection that passes a gas, the flow rate of the gas that flows through the outlet port for detection is higher than that of the gas that flows through the outlet port for laser beam projection. Since the outlet port for detection with a higher gas flow rate is formed closer to the shielding portion than is the outlet port for laser beam projection, a larger amount of gas discharged from the outlet port for detection can be blown to the shielding portion. With the blown gas, a gas that flows from the outlet port for laser beam projection can be pushed to the side opposite to the side where the work pieces are to be welded together. Accordingly, the gasses discharged from both the outlet port for laser beam projection and the outlet port for detection can be finally allowed to flow to the side opposite to the side where the work pieces are to be welded together.

As described above, the container may include only a housing portion and a shielding portion as long as gases can be allowed to flow to the side opposite to the side where the work pieces are to be welded together by the shielding portion. However, as a more preferable embodiment, the container includes a guide portion extending toward the work pieces so as to surround the protective cover together with the shielding portion.

As described above, gases blown to the protective plate from opposite positions thereof mutually collide with each other. Therefore, the gases from the outlet ports (i.e., the outlet port for laser beam projection and the outlet port for detection) are likely to diffuse to a region around the protective cover. According to the present embodiment, even in such a case, diffusion of gases around the outlet ports to a region around the protective cover can be suppressed by the guide portion and the shielding portion, and thus, the gases can be guided toward the work pieces.

The guide portion may contact the protective cover without any gaps therebetween as long as the guide portion can guide gases toward the work pieces. However, as a more preferable embodiment, the protective cover has formed therein a front side face, a rear side face, and a pair of lateral side faces, the front side face being formed at a position facing the shielding portion, the rear side face being formed on the side opposite to the front side face, and the pair of lateral side faces being continuous with the front side face and the rear side face, the guide portion is formed so as to surround the pair of lateral side faces and the rear side face, and a gap is formed between the guide portion and each lateral side face.

According to such an embodiment, transfer of radiation heat, which is generated during welding and is directed toward the protective cover from the guide portion, can be blocked by the gap formed between the guide portion and each lateral side face of the protective cover. Further, clean air (i.e., atmosphere) can be sucked into the space within the guide portion via the gap formed between the guide portion and each lateral side face of the protective cover due to the flow of the gases discharged from the outlet ports. By the flow of the sucked air, flows of the gases, which are discharged from the outlet ports, toward the outer side of the lateral side faces of the protective cover can be suppressed.

As a more preferable embodiment, the guide portion is attached to the rear side face via an attachment. Accordingly, since the attachment is located on the side opposite to the side where the work pieces are to be welded together, the attachment will not be exposed directly to radiation heat generated during welding of the work pieces. Consequently, even if the guide portion is heated with the radiation heat, heating of the sensor unit housed within the case body via the protective cover due to the heat can be reduced.

The shape of the guide portion is not particularly limited as long as the guide portion can guide gases discharged from the outlet ports as described above. However, as a more preferable embodiment, the guide portion includes a lateral plate portion and a rear plate portion, the lateral plate portion being formed at a position facing each lateral side face, and the rear plate portion being formed continuously with the lateral plate portion at a position facing the rear side face, and the rim of the lateral plate portion on the side of the work pieces is inclined to become closer to the protective cover in the direction toward the rear plate portion from the side of the shielding portion.

According to such an embodiment, since the rim of the lateral plate portion of the guide portion on the side of the work pieces is inclined to become closer to the protective cover in the direction toward the rear plate portion of the guide portion from the side of the shielding member, gases become easier to flow to the side opposite to the side where the work pieces are to be welded together.

Advantageous Effects of Invention

According to the present invention, gases discharged from the outlet ports of the housing case are blown to the shielding portion and thus flow to the side opposite to the side where the work pieces are to be welded together. Therefore, the influence of the gases discharged from the outlet ports of the housing case on welding can be reduced.

BRIEF DESCRIPTION OF DRAWINGS

FIG. 7 is an exploded perspective view of the protective cover illustrated in FIG. 4.

FIG. 9 is an exploded perspective view of a shielding member of the sensor device for welding illustrated in FIG. 1.

DESCRIPTION OF EMBODIMENTS

Hereinafter, a sensor device for welding (hereinafter referred to as a "sensor device") according to an embodiment of the present invention will be described with reference to FIGS. 1 to 11.
1. Attached State of Sensor Device 1 and Overall Configuration of Sensor Device 1

Figure 1:
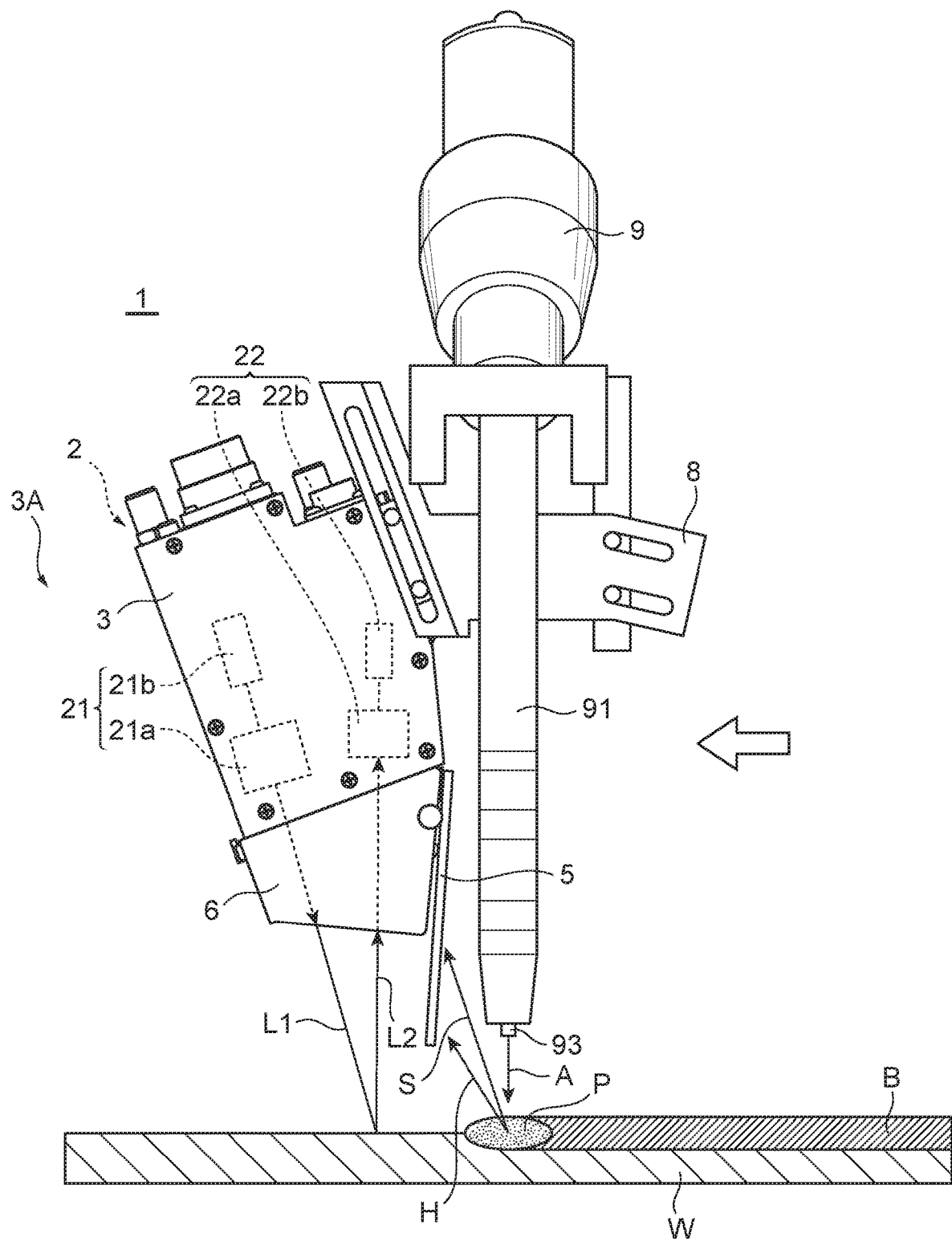
FIG. 1 is a schematic side view of a sensor device for welding, in a state attached to a welding device according to an embodiment of the present invention.

As illustrated in FIG. 1, the sensor device 1 according to the present embodiment is attached to a welding device 9 via an attachment jig 8. A welding torch 91 of the welding device 9 is supplied with a welding wire 93 and a voltage is applied across the tip end of the welding wire 93, which is fed from the welding torch 91, and work pieces W during welding so that an arc A is generated between them. Accordingly, the welding wire 93 and the work pieces W are melted and a molten pool P is generated on the work pieces W and thus, the work pieces W can be welded together. The welding device 9 is moved in the direction of the arrow indicated in FIG. 1 while the molten pool P is formed on the work pieces W so that a welded portion (i.e., bead) B is formed between the work pieces W. FIG. 1 depicts a single work piece as the work pieces W for the purpose of convenience, but in practice, two or more work pieces are welded together through butt welding, fillet welding, or lap welding, for example, and the welding method is not particularly limited. Further, although the present embodiment specifically illustrates an example in which work pieces are welded together through arc welding using a welding wire, other welding methods, such as TIG welding, electron beam welding, laser beam welding, or gas welding, can also be used.

To stably weld the work pieces W together using the welding device 9, it is important to measure the distance between the welding torch 91 and the work pieces W or the shapes of the work pieces W. Thus, in the present embodiment, the shapes of the work pieces W or the distance to the work pieces W is measured using the sensor device 1, for example.

As illustrated in FIG. 1, the sensor device (i.e., sensor head) 1 according to the present embodiment includes a sensor unit 2 and a container 3A housing the sensor unit 2. In the present embodiment, the container 3A includes a housing case (i.e., housing portion) 3 with a protective cover 40 attached thereto, a shielding member (i.e., shielding portion) 5 attached to the housing case 3, and a guide member (i.e., guide portion) 6. In the present embodiment, the housing case 3, the shielding member 5, and the guide member 6 are separable members, but may also be of an integrated structure. In addition, the guide member 6 of the container 3A may be omitted as appropriate.
2. Regarding Sensor Unit 2

The sensor unit 2 is a device for measuring the shapes of the work pieces W or the distance to the work pieces W (from the sensor unit 2) from a detected laser beam (i.e., detected light beam) L2. In the present embodiment, the sensor unit 2 includes, for example, a laser beam projection unit 21 that projects a laser beam L1 onto the surfaces of the work pieces W to be welded together, and a detection unit 22 that detects a laser beam L2 reflected from the surfaces of the work pieces. The laser beam projection unit 21 includes a laser beam source 21b that generates a laser beam, and a projection device (optics) 21a that projects the laser beam L1 generated by the laser beam source 21b onto the work pieces W.

The detection unit 22 includes a photodetector device (optics) 22a that receives a laser beam L2, which is generated as the laser beam L1 projected by the projection device 21a is reflected from the surfaces of the work pieces W, and a detection device 22b that detects the laser beam L2 sent from the photodetector device 22a. The photodetector device 22a sends the received laser beam L2 to the detection device 22b, and the detection device 22b, which is an imaging device (i.e., camera), for example, detects the laser beam L2 and sends data on the detected laser beam L2 to an image processing device (not illustrated) outside or inside of the sensor device. The image processing device measures the shapes (or states) of the work pieces W or the distance from the sensor unit 2 (specifically, from the laser beam source 21b) to the work pieces W, and then calculates the distance between the welding torch 91 and the work pieces W from the measured distance, for example.

Although the present embodiment illustrates the sensor unit 2 including the laser beam projection unit 21 and the detection unit 22 as an exemplary sensor unit, it is also possible to provide a separate laser beam projection unit outside of the sensor device 1 for welding and omit the laser beam projection unit 21 in the sensor unit 2. In such a case, the sensor device 1 for welding does not include the laser beam projection unit 21. Therefore, each portion used for laser beam projection described below (e.g., a pass-through portion 36a for laser beam projection of a case body 30 and a protective portion 44a for laser beam projection of a protective plate 44 described below) can be omitted.

In the present embodiment, although the sensor unit 2 uses the laser beams L1 and L2 to measure the states (i.e., shapes) of the work pieces W or the distance from the detection unit 22 to the work pieces W, it is also possible to detect, as a detection light beam, a light beam, which has been generated from the molten pool P on the work pieces W during welding, or a light beam, which has been reflected into the work pieces W from an external light source or the like, without using the laser beams, for example. In such a case also, the laser beam projection unit 21 in the sensor unit 2 illustrated in the present embodiment may be omitted, and it is acceptable as long as the detection unit includes at least a photodetector device (i.e., optics) that receives a detection light beam directed toward the surfaces of the work pieces W, and an imaging device (i.e., camera) that detects the detection light beam sent from the photodetector device. Since the sensor device 1 for welding does not include the laser beam projection unit 21, each portion used for laser beam projection described below can be omitted. Data on the detection light beam is sent to the image processing device (not illustrated) outside or inside of the sensor device so that the states of the work pieces W (e.g., the molten state of the molten pool P) can be measured. A voltage applied across the tip end of the welding wire 93 fed from the welding torch 91 and the work pieces W during welding may be controlled on the basis of the measured states of the work pieces W. Alternatively, the sensor unit may measure the states of the work pieces W to be welded together or the distance to the work pieces W using ultrasonic waves or electromagnetic waves.

3. Regarding Housing Case 3

Figure 5:
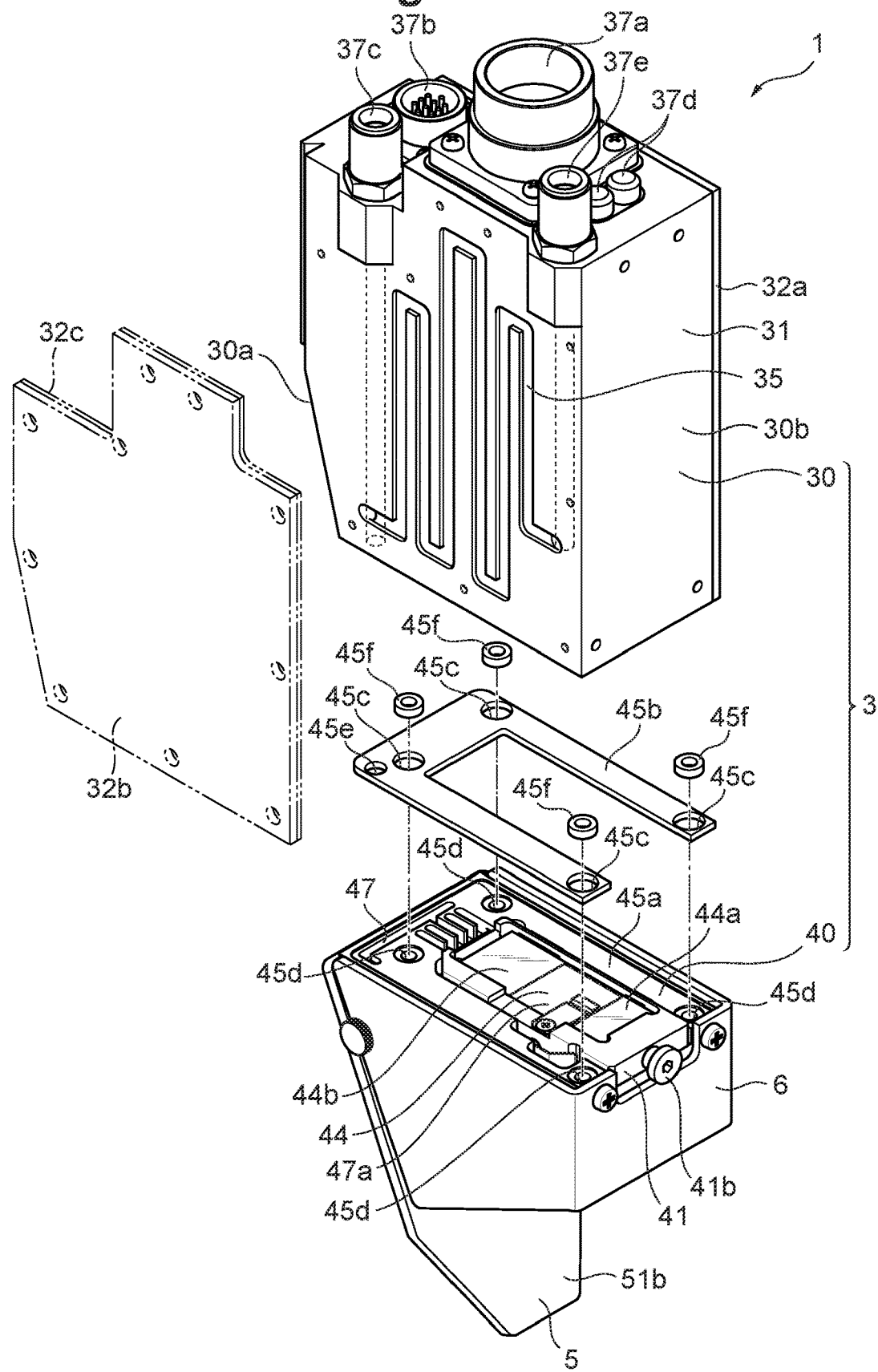
FIG. 5 is a schematic exploded perspective view of the sensor device for welding illustrated in FIG. 3 with a cover of a case body removed.

The housing case 3 houses the sensor unit 2 and has formed therein pass-through portions (specifically, see a pass-through portion 36a for laser beam projection and a pass-through portion 36b for detection in FIG. 5) that pass the laser beam L1 emitted from the laser beam projection unit 21 and the laser beam L2 directed toward the detection unit 22, respectively. The pass-through portions may be openings, for example, as long as they can transmit the laser beams L1 and L2, respectively, and the openings may be covered with materials (e.g., transparent resin or glass) that can transmit the laser beams L1 and L2, respectively. In the present embodiment, the housing case 3 includes the case body 30 and the protective cover 40.

3-1. Regarding Case Body 30

Figure 2:
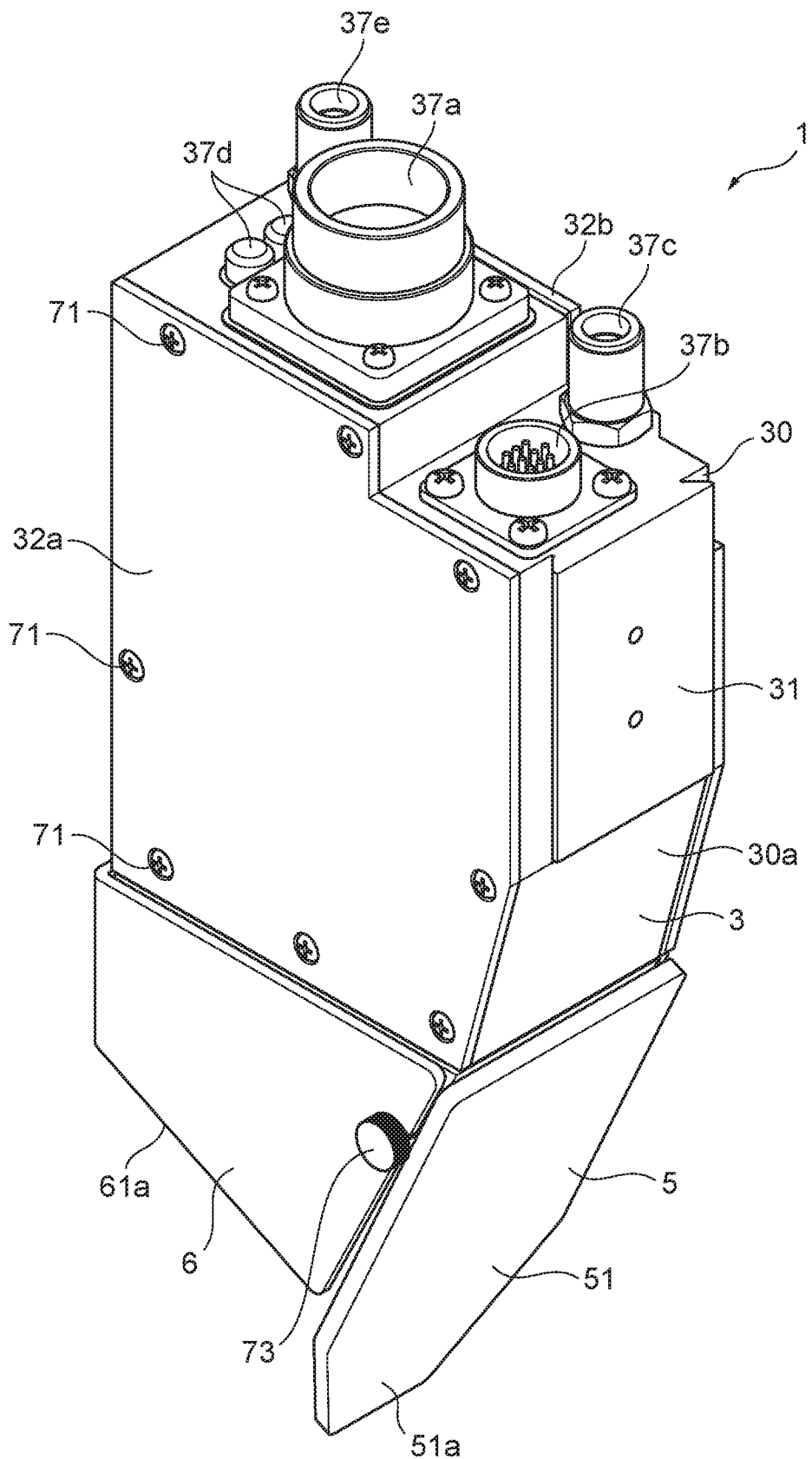
FIG. 2 is a schematic perspective view of the sensor device for welding illustrated in FIG. 1 seen from one side thereof.
Figure 3:
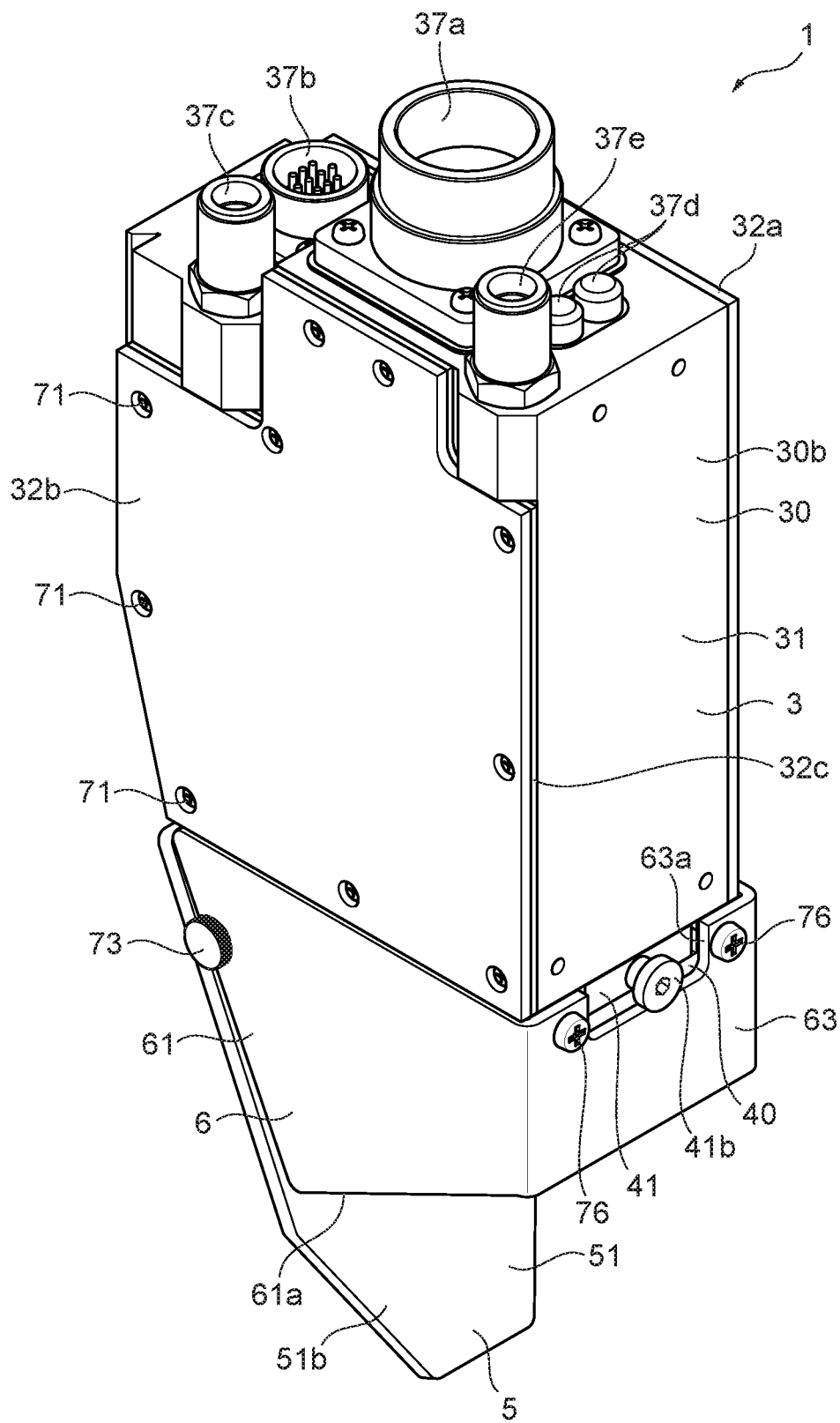
FIG. 3 is a schematic perspective view of the sensor device for welding illustrated in FIG. 1 seen from the other side thereof.
Figure 4:
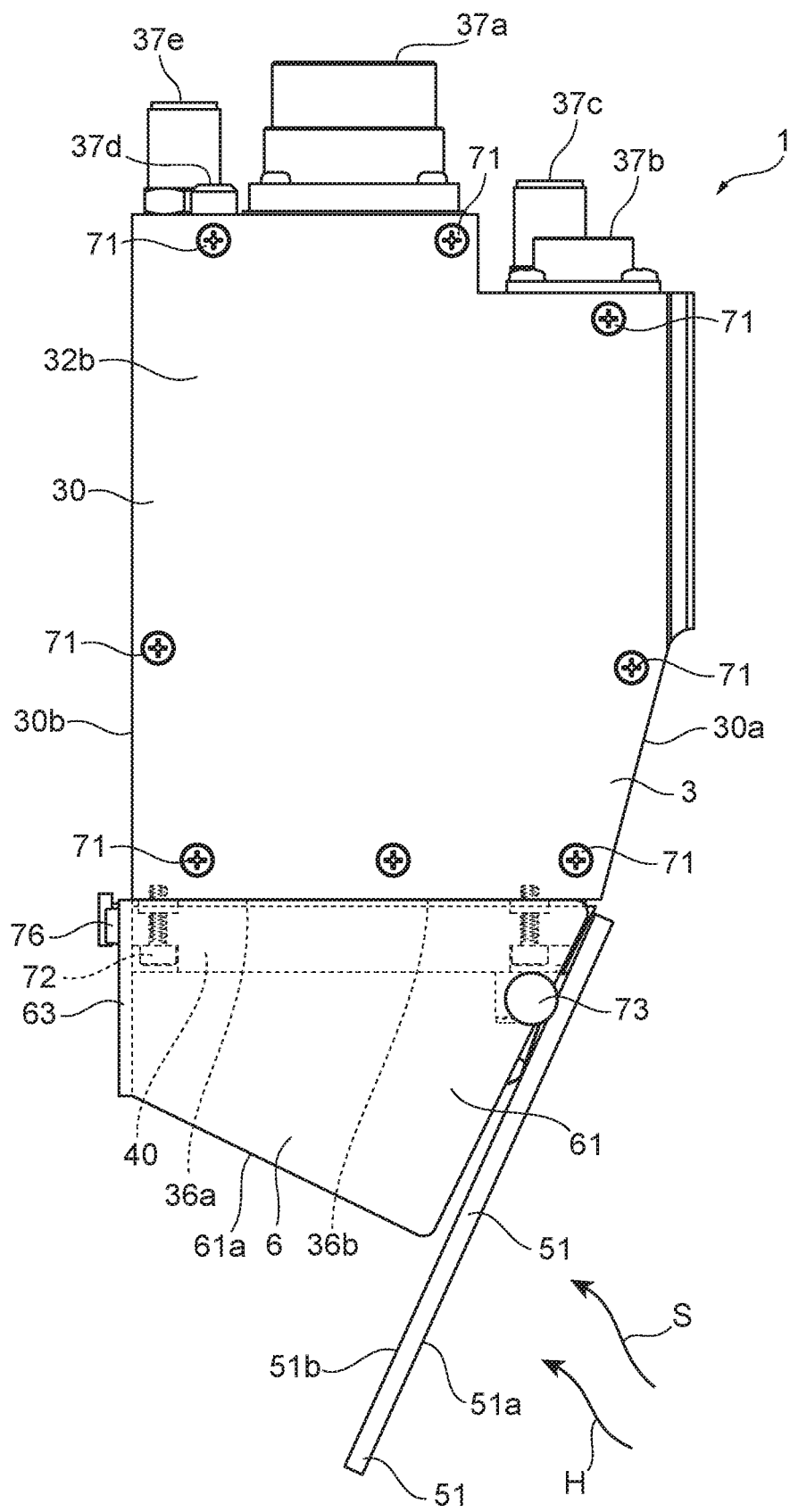
FIG. 4 is a schematic side view of the sensor device for welding illustrated in FIG. 1.

In the present embodiment, the case body 30 is an assembly for housing the sensor unit 2. As illustrated in FIGS. 2 and 3, the case body 30 includes a chassis 31, which has a recess (not illustrated) for housing the sensor unit 2, and covers 32a and 32b attached to the opposite sides of the chassis 31 with fasteners 71, such as screws. The cover 32a on one side is adapted to cover the recess in which the aforementioned sensor unit 2 is housed. As illustrated in FIGS. 4 and 5, the cover 32b on the other side covers the chassis 31 via a sealing member 32c so as to form a first gas flow channel 35 with a serpentine shape in the case body 30.

Herein, examples of a gas supplied to the first gas flow channel 35 include air (atmosphere), helium gas, argon gas, nitrogen gas, carbon dioxide gas, and a mixed gas thereof. Preferably, a gas that can cool the sensor device 1 for welding during welding and is chemically stable with respect to the portions of the work pieces W to be welded together is used. For example, a gas from a source of supply of a shielding gas for welding (not illustrated) may be used.

In the present embodiment, the first gas flow channel 35 includes a first cooling flow channel 35a that is formed in a region of from a gas supply port 37c described below to the inside of the case body 30 on its front face 30a side (i.e., inside a wall portion forming the front face 30a). The first gas flow channel 35 further includes a second cooling flow channel 35d that branches off the first cooling flow channel 35a at a branch port 35b and is formed by covering a groove portion 35e, which is formed on a side face 35g of the chassis 31, with a cover 32d. It should be noted that the first cooling flow channel 35a communicates with a second gas flow channel 47 at a communication port 35c of the case body 30. Further, the second cooling flow channel 35d communicates with a third cooling flow channel 35f formed inside a wall portion forming a rear face 30b of the case body 30, and the third cooling flow channel communicates with a gas discharge port 37e. Supplying a gas to the first gas flow channel 35 can cool the sensor unit 2 within the case body 30 and reduce a temperature rise of the sensor unit 2 during welding.

The upper face of the case body 30 is provided with a connecting terminal 37a for outputting detected signals from the sensor unit 2, for example, and a connecting terminal 37b for supplying power to the sensor unit 2 and receiving control signals for the sensor unit 2, for example. Further, the upper face of the case body 30 is provided with the gas supply port 37c for supplying a gas to the first gas flow channel 35 and to the protective cover 40, and the gas discharge port 37e for discharging a gas from the first gas flow channel 35. Besides, a lamp 37d that displays the ON or OFF state of a power supply for the sensor unit 2 is also provided.

Figure 6:
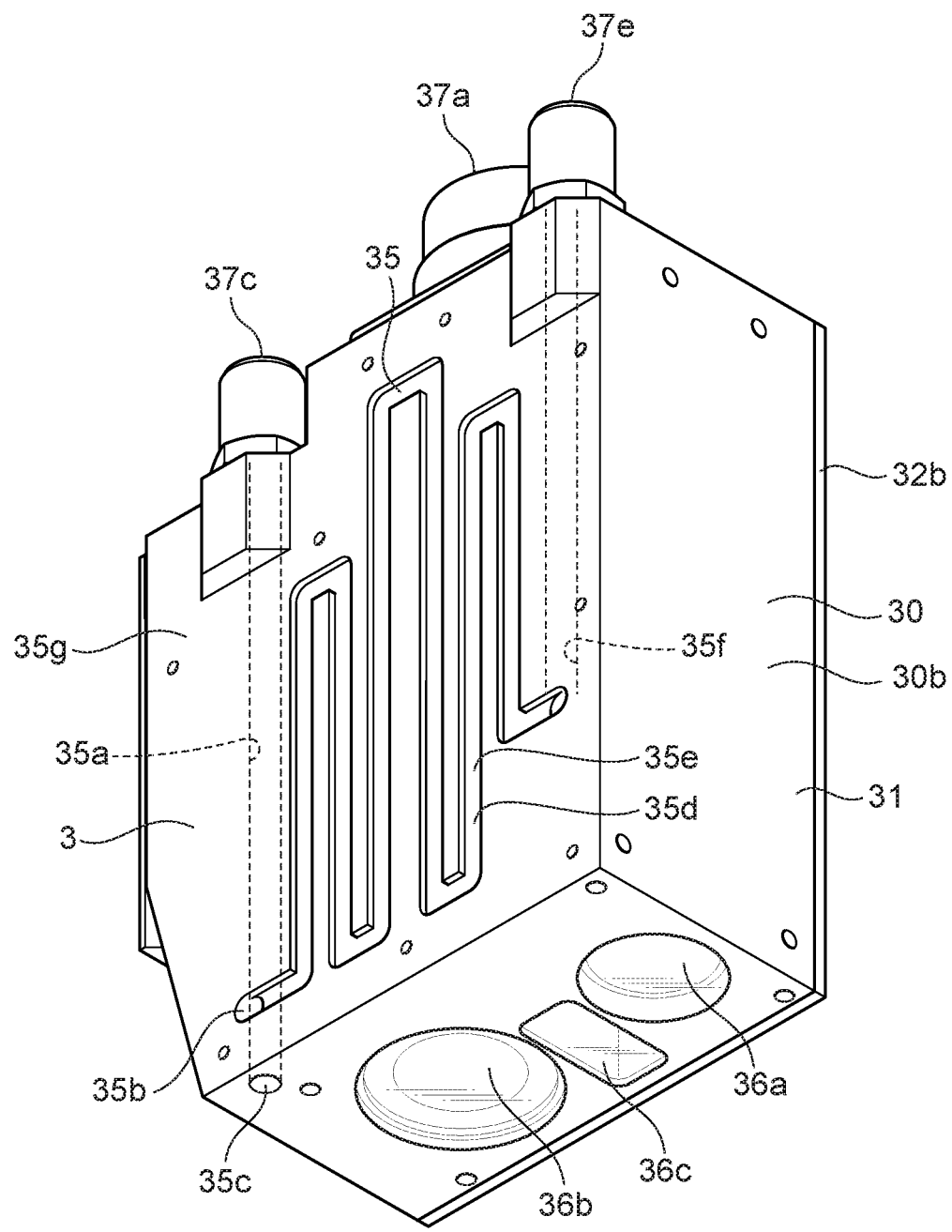
FIG. 6 is a schematic perspective view of the case body of the sensor device for welding illustrated in FIG. 5 seen from the bottom side.

As illustrated in FIG. 6, the case body 30 housing the sensor unit 2 has formed therein, as pass-through portions, a pass-through portion 36a for laser beam projection that passes the laser beam L1 from the laser beam projection unit 21, and a pass-through portion 36b for detection that passes the laser beam L2 directed toward the detection unit 22. It should be noted that the case body 30 also has a detection window 36c for a sensor (not illustrated) to check if a cartridge 41 described below is present or absent. In the present embodiment, the pass-through portion 36a for laser beam projection and the pass-through portion 36b for detection are formed individually in the case body 30, but they may be formed continuously as long as the detection accuracy of the sensor unit 2 can be secured. In the present embodiment, the pass-through portion 36a for laser beam projection and the pass-through portion 36b for detection are portions where circular plates, which transmit the laser beams L1 and L2, respectively, are arranged within circular openings.

3-2. Regarding Protective Cover 40

The protective cover 40 partially forms the housing case 3, and includes the protective plate 44. The protective cover 40 is attached to the case body 30 from its bottom side with fasteners 72, such as screws, so that the pass-through portion 36a for laser beam projection and the pass-through portion 36b for detection are covered with the protective plate 44 (e.g., see FIGS. 4, 5, and 10). More specifically, the protective cover 40 includes the cartridge 41 including the protective plate 44, and a holder 45 detachably holding the cartridge 41. The holder 45 is attached to the case body 30 from its bottom side with the fasteners 72 (see FIGS. 4 and 10).

The protective cover 40 has a front side face 40a formed at a position facing the shielding member 5, a rear side face 40b formed on the side opposite to the front side face 40a, and a pair of lateral side faces 40c and 40c continuous with the front side face 40a and the rear side face 40b. The cartridge 41 is detachable from the holder 45 from the rear side face 40b side of the protective cover 40 (For example, see FIGS. 5 and 7).

The holder 45 of the protective cover 40 includes a holder body 45a and a sealing member 45b. The holder body 45a has formed therein the second gas flow channel 47 so that a gas can flow to the protective cover 40 from the first gas flow channel 35 formed in the case body 30. The sealing member 45b is a member formed between the holder body 45a and the case body 30, for preventing leakage of a gas flowing through the second gas flow channel 47, and is made of a flexible sheet material, such as rubber or resin.

Further, the holder body 45a and the sealing member 45b have formed therein through-holes 45c and 45d. A ring-shaped spacer 45f is inserted through each of the through-holes 45c and 45d. The spacer 45f is arranged so as to be seated around a portion of the holder body 45a where each through-hole 45c is formed. As described above, as four spacers 45f are seated in the through-holes 45d of the holder body 45a and are further inserted through the through-holes 45c of the sealing member 45b, the sealing member 45b can be arranged at a proper position. This can avoid degradation of the sealing property of the second gas flow channel 47 due to positional deviations of the sealing member 45b. The holder 45 is attached to the case body 30 with the fasteners 72, such as bolts, inserted through the spacers 45f. In addition, the sealing member 45b has formed therein a communication hole 45e to allow a gas to flow through the second gas flow channel 47 formed between the protective cover 40 and the holder body 45a from the first gas flow channel 35 formed in the case body 30.

Each spacer 45f is preferably made of a material with lower thermal conductivity than those of the materials of the case body 30 and the protective cover 40. For example, when each of the case body 30 and the protective cover 40 is made of a metallic material, each spacer 45f is made of a ceramic material. Further, since each spacer 45f is made of a material with lower thermal conductivity than those of the protective cover 40 and the case body 30, the amount of heat transferred to the case body 30 from the protective cover 40 via the spacer 45f can be reduced.

As illustrated in FIG. 7, the holder 45 has attached thereto a leaf spring 49 that is bent so as to form a projection 49a, and the projection 49a of the leaf spring 49 engages a recess 41a of the cartridge 41 so that the cartridge 41 can be held in the holder 45. Meanwhile, when the cartridge 41 is pulled out of the holder 45 with a gripper 41b of the cartridge 41 being gripped, the leaf spring 49 elastically deforms. Therefore, the recess 41a of the cartridge 41 and the projection 49a of the leaf spring 49 can be easily disengaged.

The cartridge 41 includes the protective plate 44, and the protective plate 44 is detachably held in the cartridge body 42 by a clip 41c. The protective plate 44 is preferably made of a transparent material that transmits the laser beams L1 and L2, and examples of such material include glass and resin. The protective plate 44 includes a protective portion 44a for laser beam projection that covers the pass-through portion 36a for laser beam projection, a protective portion 44b for detection that covers the pass-through portion 36b for detection, and a cover portion 44c having formed thereon a metal film, such as aluminum foil, between the protective portion 44a for laser beam projection and the protective portion 44b for detection. With the cover portion 44c provided, it is possible to easily check if the protective plate 44 is arranged in the cartridge 41.

In the present embodiment, in a state in which the cartridge 41 is loaded, the pass-through portion 36a for laser beam projection and the pass-through portion 36b for detection of the case body 30 are covered with the protective portion 44a for laser beam projection and the protective portion 44b for detection of the protective plate 44, respectively. This can suppress entry of fume and the like, which are generated during welding, into the pass-through portion 36a for laser beam projection and the pass-through portion 36b for detection.

Herein, as a preferable embodiment, the second gas flow channel 47 is formed such that gases are blown toward the protective plate 44 from opposite positions around the protective plate 44 on the side of an outlet port described below. Specifically, the second gas flow channel 47 is formed such that gases are blown toward the protective portion 44a for laser beam projection from opposite positions around the protective plate 44 on the side of an outlet port 48a for laser beam projection. Similarly, the second gas flow channel 47 is formed such that gases are blown toward the protective portion 44b for detection from opposite positions around the protective plate 44 on the side of an outlet port 48b for detection.

The second gas flow channel 47 of the holder 45 has formed therein outlet ports for discharging gases, which have been blown to the protective plate 44, to the side on which the laser beam L1 is projected (i.e., on the side of the work pieces). In the present embodiment, the outlet ports include, in a state in which the cartridge 41 is loaded into the holder 45, the outlet port 48a for laser beam projection through which a gas, which has been blown to the protective portion 44a for laser beam projection, is discharged, and the outlet port 48b for detection through which a gas, which has been blown to the protective portion 44b for detection, is discharged.

Herein, the second gas flow channel 47 is a flow channel formed in the protective cover 40 in a state in which the protective cover 40 is attached to the case body 30. The second gas flow channel 47 has an accumulator 47a formed therein (for example, see FIGS. 7, 8A, and 8B). The accumulator 47a is adapted to stabilize the pressure of a gas within the second gas flow channel 47 in a space formed between the cartridge 41 and the case body 30. It should be noted that the case body 30 is omitted in FIGS. 8A and 8B. Though not illustrated in FIG. 8A, the pass-through portion 36a for laser beam projection of the case body 30 is located at a position facing the protective portion 44a for laser beam projection, and though not illustrated in FIG. 8B, the pass-through portion 36b for detection of the case body 30 is located at a position facing the protective portion 44b for detection. Further, in FIGS. 8A and 8B and FIG. 11 described later, flows of gases are indicated by arrows, and the flows of the gases will be described with symbol "F" added thereto when such drawings are seen.

Figure 8A:
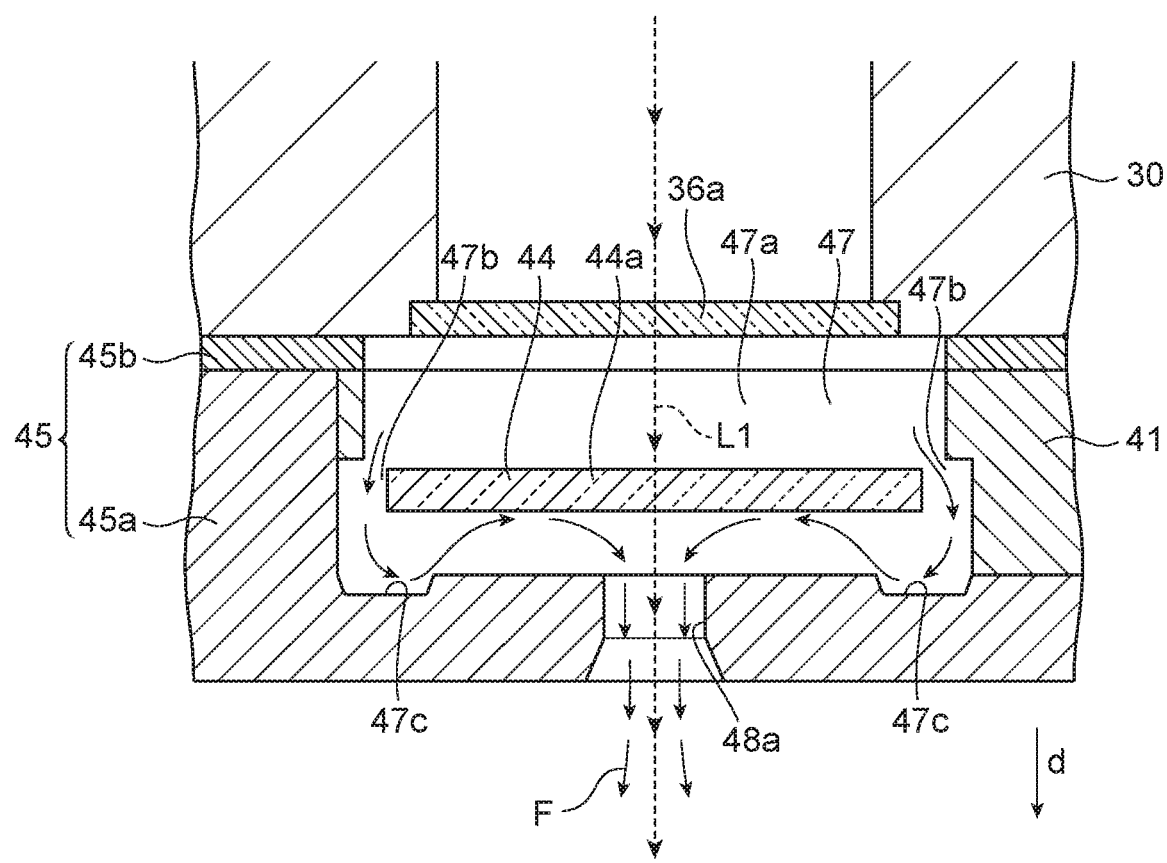
FIG. 8A is a schematic cross-sectional view in the direction of the arrows along line A-A of FIG. 7.

As illustrated in FIG. 8A, slits 47b and 47b are formed on the opposite sides of the accumulator 47a, between the protective portion 44a for laser beam projection of the protective plate 44 and the cartridge body 42. Each slit 47b functions as a throttle for the flow of the gas F and thus can maintain the pressure within the accumulator 47a constant. Thus, the gas F with an increased flow velocity is discharged from the slit 47b.

Further, on the downstream side of each slit 47b, a guide groove 47c is formed that guides the flow of the gas F, which has passed through the slit 47b and flowed to a portion around the protective cover 40 on the side of the outlet port 48a for laser beam projection, toward the protective portion 44a for laser beam projection. Specifically, each guide groove 47c is formed in the holder body 45a of the holder 45 so as to face each slit 47b.

In this manner, the gases F blown to the protective portion 44a for laser beam projection of the protective plate 44 from the opposite sides thereof flow in the directions to face each other. Thus, the gases F flowing in the directions to face each other mutually collide with each other while also colliding with the surface of the protective portion 44a for laser beam projection of the protective plate 44 so that the flow velocities of the gases F are reduced and the resulting merged gas F can be discharged from the outlet port 48a for laser beam projection.

In the present embodiment, since the gases F have the reduced flow velocities, the gases F become less likely to flow toward the side where the work pieces W are to be welded together (that is, toward the welding torch 91). Thus, stable welding can be performed. As the gases F are blown to the protective portion 44a for laser beam projection of the protective plate 44 from opposite positions of a portion around the protective plate on the side of the outlet port, sticking of foreign matter and the like to the protective portion 44a for laser beam projection of the protective plate can be reduced, and also, fume entering the outlet port 48a for laser beam projection can be reduced.

Figure 8B:
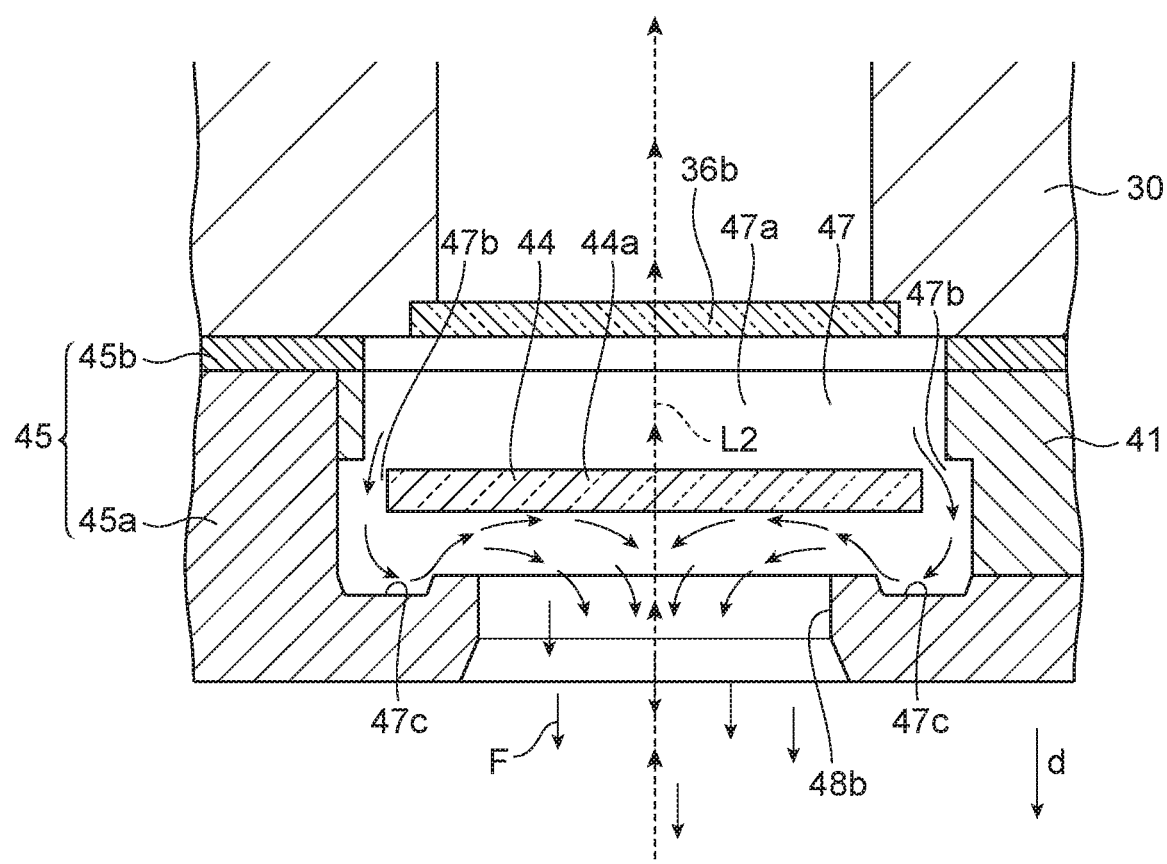
FIG. 8B is a schematic cross-sectional view in the direction of the arrows along line B-B of FIG. 7.

Similarly, as illustrated in FIG. 8B, the slits 47b and 47b are also formed on the opposite sides of the accumulator 47a, between the protective portion 44b for detection of the protective plate 44 and the cartridge body 42. On the downstream side of each slit 47b, a guide groove 47c is formed that guides the flow of the gas F, which has passed through the slit 47b and flowed to a portion around the protective cover 40 on the side of the outlet port 48b for detection, toward the protective portion 44b for detection. Specifically, each guide groove 47c is formed in the holder body 45a of the holder 45 so as to face each slit 47b.

In this manner, the gases F blown to the protective portion 44b for detection of the protective plate 44 from the opposite sides thereof flow in the directions to face each other. Thus, the gases F mutually collide with each other while also colliding with the surface of the protective portion 44b for detection of the protective plate 44. Consequently, the flow velocities of the gases F are reduced and the resulting merged gas F can be discharged from the outlet port 48b for detection. Accordingly, as with the case described above, the stability of the welding can be secured, and sticking of foreign matter to the protective portion 44b for detection can be reduced, and also, entry of fume into the outlet port 48b for detection can be reduced.

In addition, in the present embodiment, the cross-section of the flow channel of the outlet port 48b for detection through which the gas F flows is larger than that of the outlet port 48a for laser beam projection through which the gas F flows. Therefore, the flow rate of the gas F flowing through the outlet port 48b for detection is higher than that of the gas F flowing through the outlet port 48a for laser beam projection. Since the outlet port 48b for detection, through which the gas F flows at a higher flow rate, is formed closer to the shielding member 5 than is the outlet port 48a for laser beam projection (see FIG. 10), a larger amount of gas F discharged from the outlet port 48b for detection can be blown to the shielding member 5. Accordingly, the shielding member 5 can be efficiently cooled from its rear face 51b side.

4. Regarding Shielding Member 5

As illustrated in FIG. 4, the shielding member 5 that partially forms the sensor device 1 shields, among radiation heat generated while the work pieces W are welded together, radiation heat H directed toward the lower surface of the housing case 3 (specifically, on a side where the pass-through portion 36a for laser beam projection and the pass-through portion 36b for detection are formed). The shielding member 5 shields sputter S scattered from the molten pool P toward the lower surface of the housing case 3.

Herein, the shielding member 5 is preferably made of a material with lower thermal conductivity than that of the material of the housing case 3. In the present embodiment, when each of the case body 30 and the protective cover 40 is made of a metallic material, the shielding member 5 is preferably made of a non-metallic material, such as a resin material or a ceramic material, with lower thermal conductivity than that of the metallic material. Since the material of the shielding member 5 is made of a material with lower thermal conductivity than that of the material of the housing case 3, transfer of heat from the shielding member 5 to the housing case 3 can be reduced. Therefore, as the sensor unit 2 within the housing case 3 is unlikely to be influenced by radiation heat, the detection accuracy of the sensor unit 2 can be secured.

As illustrated in FIG. 9, the shielding member 5 has formed therein a plate-like portion 51, which shields radiation heat generated during welding, and two first attachment portions 52 and 52 for attaching the shielding member 5 to the housing case 3. Each first attachment portion 52 is formed on the rear face 51b of the plate-like portion 51 on the side opposite to the front face 51a side where the work pieces W are to be welded together.

The protective cover 40 (specifically, the holder 45) of the housing case 3 has formed thereon a second attachment portion 46 for attaching the shielding member 5 to the protective cover 40 on the rear face 51b side of the plate-like portion 51. In a state in which the shielding member 5 is attached to the protective cover 40, the second attachment portion 46 is arranged between the two first attachment portions 52 and 52 of the shielding member 5.

Each first attachment portion 52 of the shielding member 5 and the second attachment portion 46 of the protective cover 40 have formed therein through-holes 52a and 46a, respectively, for passing an attachment shaft 73 along the direction in which the plate-like portion 51 of the shielding member 5 extends (specifically, the lateral direction of the sensor device 1). The shaft 73 is made of a metallic material or a ceramic material, for example.

The shielding member 5 is attached to the protective cover 40 of the housing case 3 as the shaft 73 is inserted through the through-holes 52a of the pair of first attachment portions 52 and the through-hole 46a of the second attachment portion 46 formed between them. The shaft 73 includes a shaft body 73a and a screw body 73b screwably attached thereto. After the shaft body 73a is inserted through the through-holes 52a and 46a from a lateral face side of the housing case 3 (or the protective cover 40), the screw body 73b is screwed into the shaft body 73a so that the shielding member 5 can be attached to the protective cover 40. The guide member 6 described below can be sandwiched between the shaft body 73a and heads 73c and 73d of the screw body 73b from the opposite sides thereof.

In the housing case 3, an elastic member 75 made of metal, which urges the shielding member 5 toward the side where the work pieces W are to be welded together, is attached to the second attachment portion 46 of the protective cover 40 in a state in which the shielding member 5 is attached to the housing case 3 (or the protective cover 40 thereof). In the present embodiment, in a state in which the shielding member 5 is urged by the elastic member 75, a gap is formed between the housing case 3 and the plate-like portion 51 of the shielding member 5 and a gap is also formed between the guide member 6 and the plate-like portion 51 of the shielding member 5 (see FIG. 4). Due to such gaps, heat becomes less easily transferred to the housing case 3 from the shielding member 5. In addition, since the shielding member 5 is elastically urged by the elastic member 75 in a state in which such gaps are formed, the elastic member 75 functions as a shock absorbing member. Therefore, damage to the shielding member 5 can be suppressed.

Figure 11:
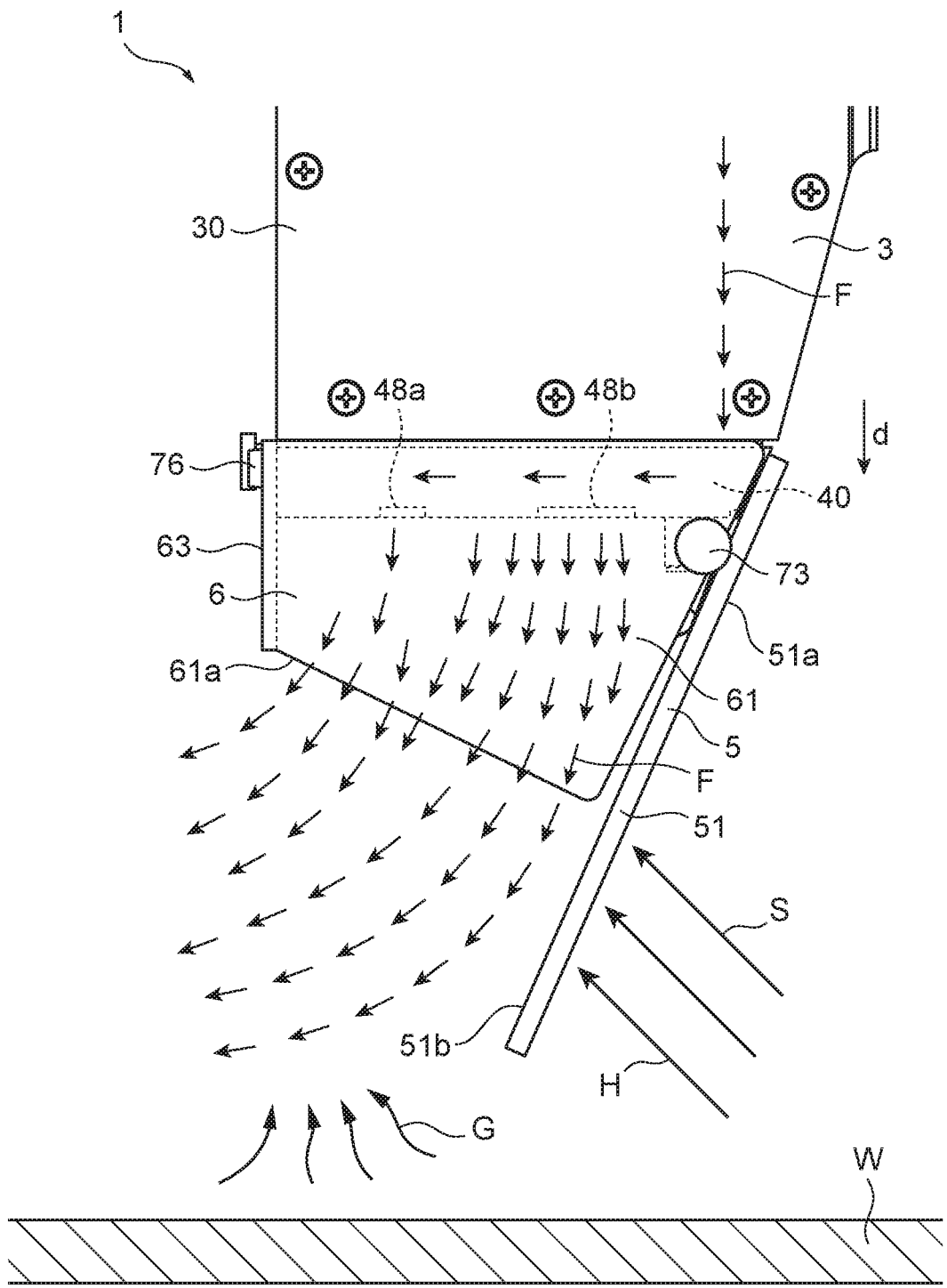
FIG. 11 is a schematic side view for illustrating flows of gases around the sensor device for welding illustrated in FIG. 4.

In the present embodiment, as illustrated in FIG. 11, the shielding member 5 is inclined with respect to the flow direction d of the gas F that passes through the outlet port 48b for detection so that the gas F discharged from the outlet port 48b for detection is blown to the shielding member 5 and thus flows to the side opposite to the side where the work pieces W are to be welded together. Specifically, the shielding member 5 is arranged in a region on which the outlet port 48b for detection is projected along the flow direction d of the gas F. The shielding member 5 is inclined to become closer to the work pieces W in the direction toward the side opposite to the side where the work pieces W are to be welded together. It should be noted that the "flow direction of the gas F that passes through the outlet port" as referred to in this specification means a direction in which the gas F flows through the center of the cross-section of the flow channel of the outlet port.

The gas F moving straight along the flow direction d from the outlet port 48b for detection collides with the rear face 51b of the plate-like portion 51 of the inclined shielding member 5. Accordingly, since the gas F discharged from the outlet port 48b for detection is blown to the shielding member 5, the shielding member 5 can be cooled with the gas F. Further, since the gas F blown to the shielding member 5 flows to the side opposite to the side where the work pieces W are to be welded together, the gas F becomes less likely to flow to the side where the work pieces W are to be welded together. Accordingly, the influence of the gas F (or a flow thereof) discharged from the outlet port 48b for detection can be reduced in the portion where the work pieces are to be welded together, and thus, stable welding can be performed. Accordingly, mixture of the gas F into the resulting welded portion B can be avoided. Thus, when arc welding is performed, there is no possibility that an arc may become unstable due to the gas F, and even when a shielding gas is flowed around the arc, the flow of the shielding gas will not be disturbed. Therefore, the welding quality can be secured.

In particular, in the present embodiment, as illustrated in FIG. 8B, the gases F blown to the protective plate 44 from opposite positions thereof mutually collide with each other while also colliding with the surface of the protective plate 44 so that the flow velocities of the gases are reduced and the resulting merged gas F can be discharged from the outlet port 48b for detection. Since the flow velocities of the gases F are reduced in this manner, the gases F become less likely to flow toward the side where the work pieces W are to be welded together.

Further, as illustrated in FIG. 11, with the gas F blown to the shielding member 5 from the outlet port 48b for detection, the gas F that flows from the outlet port 48a for laser beam projection can be pushed to the side opposite to the side where the work pieces are to be welded together. Accordingly, the gases F discharged from both the outlet port 48a for laser beam projection and the outlet port 48b for detection can be finally allowed to flow to the side opposite to the side where the work pieces W are to be welded together.

5. Regarding Guide Member 6

The sensor device 1 may further include the guide member 6. The guide member 6 extends to the side on which the laser beam L1 is projected (downward in the drawing) so as to surround the protective cover together with the shielding member 5 (see FIGS. 3 and 9). That is, the guide member 6 and the shielding member 5 form a nozzle that guides the gases F discharged from the outlet ports (i.e., the outlet port 48a for laser beam projection and the outlet port 48b for detection) toward the side of the work pieces W on which the laser beam L is projected. The guide member 6 is made of a metallic material or a ceramic material. In the present embodiment, the guide member 6 is made of brass, for example. The guide member 6 made of brass can reflect infrared rays generated during welding.

Herein, as illustrated in FIGS. 8A and 8B, the gases F blown to the protective plate 44 from opposite positions thereof mutually collide with each other. Therefore, the gases F from the outlet ports (i.e., the outlet port 48a for laser beam projection and the outlet port 48b for detection) are likely to diffuse to a region around the protective cover 40. However, in the present embodiment, since the guide member 6 surrounds the protective cover together with the shielding member 5, diffusion of the gases F to the region around the protective cover 40 can be suppressed, and the gases F can be guided to the side on which the laser beam L1 is projected.

Figure 10:
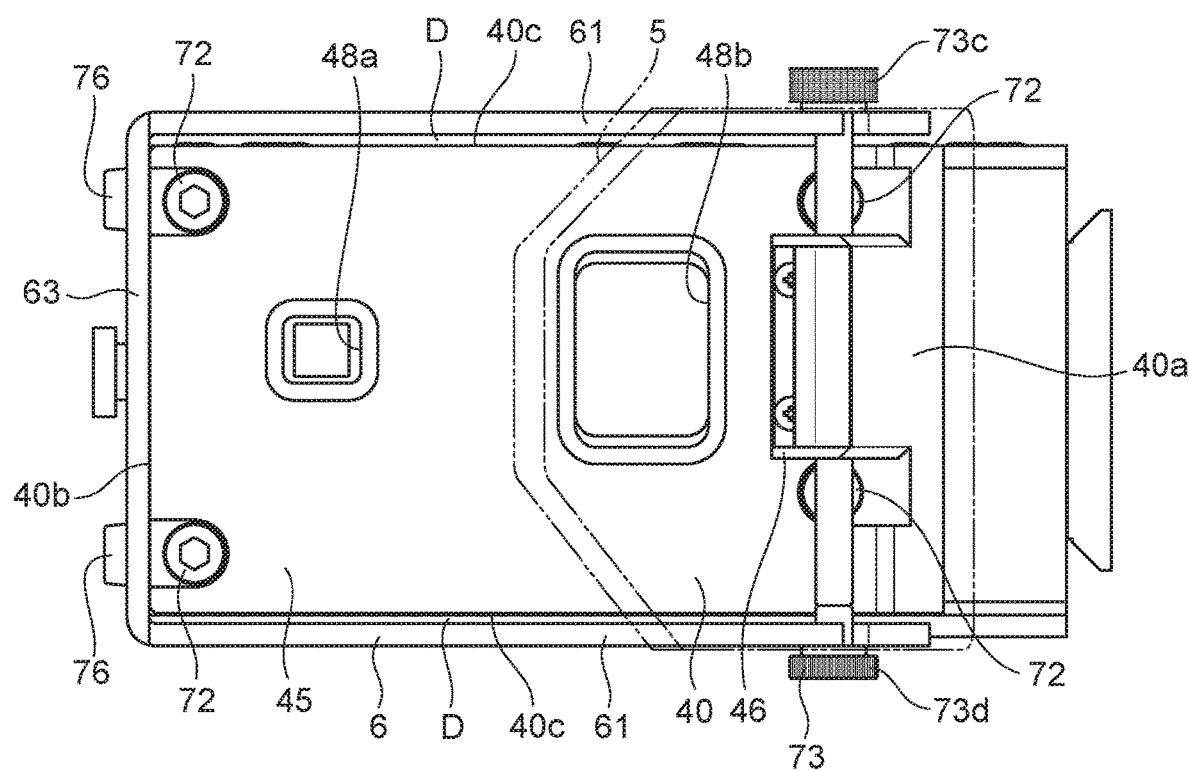
FIG. 10 is a bottom view of the sensor device for welding illustrated in FIG. 9 with the shielding member removed.

Further, in the present embodiment, as illustrated in FIG. 10, the guide member 6 is formed so as to surround the pair of lateral side faces 40c and 40c and the rear side face 40b of the protective cover 40, and a gap D is formed between the guide member 6 and each lateral side face 40c.

More specifically, the guide member 6 includes a lateral plate portion 61 that is formed at a position facing each lateral side face 40c, and a rear plate portion 63 that is formed continuously with the lateral plate portion 61 at a position facing the rear side face 40b. The aforementioned gap D is formed between the lateral side face 40c of the protective cover 40 and the lateral plate portion 61 of the guide member 6 that faces the lateral side face 40c. The rear plate portion 63 has formed therein a cutout 63a through which the cartridge 41 of the protective cover 40 is pulled out (see FIG. 3).

In the present embodiment, transfer of the radiation heat H, which is generated during welding and directed toward the protective cover 40 from the guide member 6, can be blocked by the gap D formed between the lateral side face 40c of the protective cover 40 and the lateral plate portion 61 of the guide member 6 that faces the lateral side face 40c.

Further, due to the flows of the gases F discharged from the outlet port 48a for laser beam projection and the outlet port 48b for detection, a region around the gap D is at a negative pressure. Accordingly, air (i.e., atmosphere) is sucked into the space surrounded by the guide member 6 and the shielding member 5 from a region near the side face of the case body 30 via the gap D formed between each lateral plate portion 61 of the guide member 6 and each lateral side face 40c of the protective cover 40. Due to the flow of the sucked air, flows of the gases, which have been discharged from the outlet port 48a for laser beam projection and the outlet port 48b for detection, toward the outer side of the lateral side faces 40c of the protective cover 40 can be suppressed.

As a further preferable embodiment, in the present embodiment, a rim 61a of the lateral plate portion 61 on the side where the work pieces W are to be welded together is inclined to become closer to the protective cover 40 in the direction toward the rear plate portion 63 from the side of the shielding member 5 (see FIGS. 3 and 11). This allows the gases F to more easily flow to the side (i.e., rear side) opposite to the side where the work pieces W are to be welded together, as illustrated in FIG. 1.

In the present embodiment, the guide member 6 is attached at its rear plate portion 63 to the rear side face 40b of the protective cover 40 via attachments 76, such as screws. Since the attachments 76 are located on the side opposite to the side where the work pieces W are to be welded together, there is no possibility that the attachments 76 will be exposed directly to radiation heat generated during welding of the work pieces W. Consequently, even if the guide member is heated by the radiation heat, heating of the sensor unit 2 housed within the case body 30 via the protective cover 40 due to the heat can be reduced.

Further, as illustrated in FIG. 9, the guide member 6 has formed therein slit portions 66 into which the shaft 73 is adapted to enter, and the shaft 73 is housed within the slit portions 66 formed in the guide member 6. When the guide member 6 is detached, the two attachments 76 and 76 are removed first so as to loosen the shaft body 73a and the screw body 73b fastened together. Next, pulling out the guide member 6 backward allows the shaft 73 to be pulled out of the slit portions 66 and thus allows the guide member 6 to be easily detached from the sensor device 1. Accordingly, the protective cover 40 can be inspected in a state in which the shielding member 5 is attached to the protective cover 40 and in a state in which the guide member 6 is detached from the protective cover 40.

Although the embodiments of the present invention have been described in detail above, the present invention is not limited to thereto, and various design changes can be made without departing from the spirit or scope of the invention recited in the claims.

In the present embodiment, the sensor unit projects a laser beam onto work pieces and receives a laser beam reflected from the work pieces as a detection light beam so as to measure the states (i.e., shapes) of the work pieces and the distance from the detection unit to the work pieces. However, for example, the sensor unit may image a light beam reflected from the work pieces or a light beam emitted from the work pieces during welding as a detection light beam using an imaging device (i.e., camera) so as to detect the welded states of the work pieces, for example.

What is claimed is:

1. A sensor device for welding, comprising:
a sensor configured to measure at least one of the shapes of work pieces to be welded together or a distance to the work pieces, wherein the sensor comprises a detector configured to detect a light beam reflected from a surface of the work pieces; and
a container including a housing portion, a protective cover and a shielding portion, wherein the housing portion is adapted to house the sensor and has formed therein a gas flow channel that passes a cooling gas for cooling the housing portion,
the protective cover is attached to a bottom of the housing portion and is formed with an outlet port which is in communication with the gas flow channel of the housing portion and through which the cooling gas is discharged out of the container, wherein the outlet port is arranged so that the reflected light beam passes through the outlet port and reaches the detector inside the housing portion, and
the shielding portion is adapted to protect the housing portion from radiation heat generated while the work pieces are welded together, wherein the shielding portion is inclined to intersect a flow direction of the cooling gas that passes through the outlet port along a central axis of the outlet port, so that the cooling gas discharged from the outlet port is blown against the shielding portion and changes its flow direction away from the work pieces.

2. The sensor device for welding according to claim 1, wherein
the housing body comprises a case body adapted to house the sensor, the case body having formed therein at least one pass-through portion through which the reflected light beam passes and reaches the detector,
the protective cover includes a protective plate configured to transmit the reflected light beam therethrough, the protective cover being attached to the case body so that the protective plate covers the pass-through portion, and
the gas flow channel is formed such that the cooling gas branches into multiple streams of cooling gas that circle from above the protective plate into below, protective plate where the multiple streams of cooling gas are blown toward the protective plate from opposite positions and exit from the outlet port.

3. The sensor device for welding according to claim 2, wherein the sensor includes a laser beam emitter configured to emit a laser beam onto the surface of the work pieces, and the detector configured to detect the laser beam reflected from the surface of the work pieces, the sensor being configured to measure, based on the detected laser beam, at least one of the shapes of the work pieces or a distance to the work pieces,
the pass-through portion of the case body includes an emitted laser pass-through portion and a reflected laser pass-through portion, the emitted laser pass-through portion being adapted to pass the laser beam emitted from the laser beam emitter, and the reflected laser pass-through portion being adapted to pass the reflected laser beam directed toward the detector,
the protective plate includes a first protective portion arranged to cover the emitted laser pass-through portion and a second protective portion arranged to cover the reflected laser pass-through portion,
the outlet port includes an emitted laser outlet port configured for the laser emitted from the laser beam emitter to pass through toward the work pieces and a reflected laser outlet port configured for the laser beam reflected from the work pieces to pass through toward the detector, both the emitted laser outlet port and the reflected laser outlet port being arranged to discharge the cooling gas blown to the first and second the protective portions, respectively,
the reflected laser outlet port has a flow channel larger than a flow channel of the emitted laser outlet port, and
the reflected laser outlet port is formed closer to the shielding portion than the emitted laser outlet port.

4. The sensor device for welding according to claim 2, wherein the container includes a guide portion extending toward the work pieces so as to surround the protective cover together with the shielding portion.

5. The sensor device for welding according to claim 4, wherein the protective cover has formed therein a front side face, a rear side face, and a pair of lateral side faces, the front side face being formed at a position facing the shielding portion, the rear side face being formed on a side opposite to the front side face, and the pair of lateral side faces being continuous with the front side face and the rear side face, the guide portion is formed so as to surround the pair of lateral side faces and the rear side face, and a gap is formed between the guide portion and each lateral side face.

6. The sensor device for welding according to claim 5, wherein the guide portion is attached to the rear side face of the protective cover.

7. The sensor device for welding according to claim 5, wherein the guide portion includes a pair of lateral plate portions and a rear plate portion, the pair of lateral plate portions being formed to face the pair of lateral side faces of the protective cover, respectively, and the rear plate portion being formed continuously with the pair of lateral plate portions and facing the rear side face of the protective cover, and the pair of lateral plate portions each have a bottom edge having a front end located close to the shielding portion and a rear end located opposite to the front end, wherein the bottom edges are inclined so that a vertical distance measured from a top surface of the guide portion to the front end is greater than a vertical distance measured from the top surface of the guide portion to the rear end.

\* \* \* \* \*

UNITED STATES PATENT AND TRADEMARK OFFICE
CERTIFICATE OF CORRECTION

| | |
|---|---|
| PATENT NO. | : 11,577,336 B2 |
| APPLICATION NO. | : 16/494146 |
| DATED | : February 14, 2023 |
| INVENTOR(S) | : Nobuhiro Tani et al. |

It is certified that error appears in the above-identified patent and that said Letters Patent is hereby corrected as shown below:

In the Claims

In Column 16, Claim 2, Line 28, insert --the--
And delete the "," between "below" and "protective"

Signed and Sealed this
Twenty-eighth Day of March, 2023

Katherine Kelly Vidal
*Director of the United States Patent and Trademark Office*